(12) United States Patent
Tokiwa et al.

(10) Patent No.: US 7,439,310 B2
(45) Date of Patent: Oct. 21, 2008

(54) POLYPHENYLENE ETHER MODIFIED BY REACTION WITH CRESOL NOVOLAC EPOXY RESIN

(75) Inventors: Tetsuji Tokiwa, Tokyo (JP); Tomohiro Kondo, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 285 days.

(21) Appl. No.: 11/481,001

(22) Filed: Jul. 6, 2006

(65) Prior Publication Data

US 2008/0097046 A1   Apr. 24, 2008

(51) Int. Cl.
*C08L 63/04* (2006.01)
*C08L 71/12* (2006.01)

(52) U.S. Cl. ..................................... 525/396
(58) Field of Classification Search ........................ None
See application file for complete search history.

(56) References Cited

U.S. PATENT DOCUMENTS

| 3,306,874 | A | | 2/1967 | Hay |
| 5,834,565 | A | | 11/1998 | Tracy et al. |
| 6,051,662 | A | | 4/2000 | Tracy et al. |
| 2005/0070685 | A1 | | 3/2005 | Mitsui et al. |
| 2006/0141315 | A1 | * | 6/2006 | Murata et al. .................. 429/33 |

FOREIGN PATENT DOCUMENTS

| EP | 0 573 005 A1 | | 4/1993 |
| EP | 0 592 145 A2 | | 4/1994 |
| EP | 0 921 158 A2 | | 6/1999 |
| JP | 50-15519 | | 6/1975 |
| JP | 58-219217 A | | 12/1983 |
| JP | 11-302529 A | | 11/1999 |
| JP | 2003-261674 A | | 9/2003 |
| JP | 2004-037057 A | | 2/2004 |
| JP | 2005-139378 A | * | 6/2005 |
| JP | 2005-139379 A | * | 6/2005 |
| JP | 2005-226006 A | | 8/2005 |
| JP | 2005-226006 A | * | 8/2005 |

OTHER PUBLICATIONS

Kobunshi Ronbunshu, Japanese Journal of Polymer Science and Technology, vol. 51, No. 7, pp. 479-486, (Jul. 1994).
U.S. Appl. No. 10/557,336.

* cited by examiner

*Primary Examiner*—Robert Sellers
(74) *Attorney, Agent, or Firm*—Birch, Stewart, Kolasch & Birch, LLP

(57) ABSTRACT

The present invention can provide a resin composition comprising epoxy-modified polyphenylene ethers which show good solubility in MEK or acetone which has been conventionally used in a manufacturing process for printed boards of epoxy resins, and has high heat resistance originating from polyphenylene ethers. Specifically, the resin composition of the present invention contains (C) an epoxy-modified polyphenylene ether obtained by reacting (A) a polyphenylene ether having a content of volatile components of 0.1-5.0% by weight and a number of average molecular weight of 500 or more and less than $1.0 \times 10^4$ and (B) a cresol-novolac type epoxy resin at a modification ratio of component (A) of 5-95%, wherein (B') a cresol-novolac type epoxy resin is contained in an amount of 10-900 parts by weight based on 100 parts by weight of the total of the reaction products (C), and (A') a polyphenylene ether.

6 Claims, No Drawings

POLYPHENYLENE ETHER MODIFIED BY REACTION WITH CRESOL NOVOLAC EPOXY RESIN

BACKGROUND OF THE INVENTION

1. Technical Field

The present invention relates to a resin composition of a modified polyphenylene ether, which is suitable for electrical and electronic materials such as printed boards and insulation sealing materials.

2. Prior Art

Heretofore, epoxy resins have been most generally used for electronic materials such as printed boards and insulation sealing materials. These days, a volume of information to be processed by information processing devices such as cellular phones and personal computers has been increasing so that higher processing speed has been required for such devices. Therefore, higher heat-resistance and lower permittivity are required for electronic materials. In addition, low water-absorption is also one of the important required properties to prevent circuit malfunction. As means to impart high heat-resistance, low permittivity, and low water-absorption to an epoxy resin, a method of adding polyphenylene ethers to epoxy resins is used (for example, Patent Documents 1 and 2).

However, it is difficult to apply a production line for printed boards of epoxy resins to manufacture printed boards of epoxy resins incorporating polyphenylene ethers. The reason is that the polyphenylene ethers have considerably low solubility in methyl ethyl ketene (MEK) and acetone used in the manufacturing process for printed boards of epoxy resins.

As means to solve this problem, there has been disclosed a method to modify polyphenylene ethers with a multifunctional epoxy compound such as an epoxy resin (for example, Patent Documents 3, 4, and 5).

However, the epoxy-modified polyphenylene ethers obtained according to the method disclosed in these documents have not achieved sufficient solubility.

[Patent Document 1] European Patent Application Laid-Open No. 592145

[Patent Document 2] European Patent Application Laid-Open No. 921158

[Patent Document 3] Japanese Patent Application No. S50-15519

[Patent Document 4] European Patent Application Laid-Open No. 537005

[Patent Document 5] Japanese Patent Application Laid-Open No. S58-219217

SUMMARY OF THE INVENTION

Problems to be Solved by the Invention

It is an object of the present invention to provide a resin composition comprising epoxy-modified polyphenylene ethers that have the characteristics described below. That is, the resin composition shows a good solubility in MEK and acetone, which have been conventionally used in the manufacturing process for printed boards of epoxy resins, and the electronic materials obtained there from have high heat resistance originating from polyphenylene ethers.

Means of Solving the Problems

The present inventors have made extensive and intensive studies to solve the above problems. As a result, it has been found that a resin composition comprising epoxy-modified polyphenylene ethers obtained by reacting polyphenylene ethers having volatile components at a specific ratio and a cresol-novella type epoxy resin exhibits good solubility to MEK or acetone. Furthermore, it has been found that electronic materials obtained from the resin composition have high heat resistance originating from polyphenylene ethers. Based on this finding, the present invention has been accomplished.

Namely, the present invention is as follows:

1. A resin composition comprising (C) and epoxy-modified polyphenylene ether obtained by reacting (A) a polyphenylene ether having a content of volatile components of 0.1-5.0% by weight and a number average molecular weight of 500 or more and less than $1.0 \times 10^4$ and (B) a cresol-novella type epoxy resin at a modification ratio of the component (A) of 5-95%, wherein (B') a cresol-novella type epoxy resin is contained in an amount of 10-900 parts by weight based on 100 parts by weight of the total of the reaction product (C), and (A') a polyphenylene ether.

2. The resin composition according to item 1, wherein the component (B') is contained in an amount of 25-100 parts by weight based on 100 parts by weight of the total of the components (C) and (A').

3. The resin composition according to item 1, wherein cross-linked products are not present.

4. The resin composition according to item 1, wherein the number average molecular weight of the component (A) is $500\text{-}4.0 \times 10^3$.

5. The resin composition according to item 1, wherein the number of phenol hydroxyl group on the molecular chain terminals of the component (A) is 1.3 or more per molecular chain.

6. A production process of the resin composition containing the component (C) according to any of items 1-5, wherein the components (A) and (B) are reacted at a reaction temperature of 80-250° C. for a reaction period of 1 minute to 3 hours.

Effects of the Invention

According to the present invention, an epoxy-modified polyphenylene ether resin composition which shows a good solubility in MEK or acetone and has high heat resistance originating from polyphenylene ethers is provided.

DETAILED DESCRIPTION OF THE INVENTION

Most Preferred Embodiment for Carrying Out the Invention

The present invention will be explained in more detail below.

The present invention relates to a resin composition obtained by reacting (A) a polyphenylene ether and (B) a cresol-novella type epoxy resin. The resin composition contains (B') a cresol-novella type epoxy resin and (C) an epoxy-modified polyphenylene ether, which is a reaction product of the components (A) and (B).

The component (A) used in the present invention is photopolymer or a copolymer comprising recurring units represented by the following formula (1):

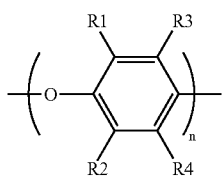

(1)

wherein n represents an integer of 0 or more; each of R1, R2, R3 and R4 independently represents a hydrogen atom, an alkyl group, or an alkyl group having an amino group.

Representative examples of the polyphenylene ether polymers used in this invention include poly(2,6-dimethyl-1,4-phenylene ether), poly(2-methyl-6-phenyl-1,4-phenylene ether), poly(2,6-dichloro-1,4-phenylene ether), and the like.

Specific examples of the polyphenylene ether copolymers used in this invention include polyphenylene ether copolymers such as copolymers of 2,6-dimethylphenol and other phenols (e.g., 2,3,6-trimethylphenol and 2-methyl-6-methyl-butylphenol), tetramethyl bisphenol A, or tetramethyl biphenol A. Among them, copolymers of 2,6-dimethylphenol and 2,3,6-trimethylphenol and copolymers of 2,6-dimethylphenol and tetramethyl bisphenol A are preferably used. Most preferred are copolymers of 2,6-dimethylphenol and tetramethyl bisphenol A.

The component (A) used in the present invention should contain volatile components in an amount of 0.1-5.0% by weight, preferably 0.5-2.0% by weight for obtaining a resin composition which shows a sufficient solubility. From the viewpoint of inhibiting side reactions such as cross linkage by homogeneously mixing the components (A) and (B), it is necessary that the content of the volatile components is 0.1% by weight or more. While, from the viewpoint of hindrance of the reaction of the components (A) and (B) caused by substances derived from the volatile components or inhibition of the side reactions, it is necessary that the content of the volatile component is 5.0% by weight or less. The term "a content of volatile components" herein means a value calculated from a weight of the polyphenylene ether after 5-hour drying under the condition of 170° C. and 10 Pa (Wa) and a weight of the polyphenylene ether before drying (Wb) based on the following equation:

[(Wb−Wa)/Wb]×100(% by weight)

The volatile components in the present invention are mainly residues of a solvent used in the production process for polyphenylene ether. Representative examples of the solvent include toluene, xylene, ethylbenzene, butanol, methanol, MEK, and the like.

To adjust the content of the volatile components in the component (A) to 0.1-5.0% by weight, it is necessary to control a drying temperature, time or the like of wet polyphenylene ether, which is obtained by separating polyphenylene ether polymerized in the solution or slurry state from a solvent. When the content of the volatile components contained in the polyphenylene ether is 0.1% by weight or less, it can be adjusted so as to be 0.1-5.0% by weight by adding the solvent used in the production process for polyphenylene ether to the polyphenylene ether. While, when the volatile component in the polyphenylene ether is contained in an amount of 5.0% by weight or more, the content of the volatile component can be adjusted by further drying the polyphenylene ether or by adding a polyphenylene ether containing 5.0% by weight or less of the volatile component to the polyphenylene ether.

The number average molecular weight of the component (A) used in the present invention is less than $1.0 \times 10^4$ from the viewpoint of mixability with the component (B). It is more preferably $5.0 \times 10^3$ or less, especially preferably $4.0 \times 10^3$ or less. As the number average molecular weight of the component (A) decreases, the mixability of the component (A) with the component (B) is advantageously improved. However, from the viewpoint of heat-resistance and low permittivity of electronic materials, the number average molecular weight of the component (A) used in the present invention is 500 or more.

The component (A) used in the present invention has a phenolic hydroxyl group on the molecular chain terminals. The number of phenolic hydroxyl groups on the molecular chain terminals is preferably 1.3 or more, more preferably 1.5 or more, per molecular chain. The phenolic hydroxyl groups on the molecular chain terminals provide a reaction point with the component (B). Therefore, as the number of the phenolic hydroxyl groups on the molecular chain terminals increases, the number of an epoxy modified group contained in a molecular chain of the component (C) increases. As a result, the component (C) improves in solubility in MEK or acetone. Furthermore, the component (C) which has epoxy groups on the both terminals of a molecular chain is superior in cross-linking performance and curing property. Therefore, electronic materials manufactured from the obtained resin composition advantageously has low permittivity and high heat resistance. From this point of view, too, it is preferably that phenolic hydroxyl groups are on the both terminals of a molecular chain.

The component (A) used in the present invention can be produced by the usual method. For example, as described in U.S. Pat. No. 3,306,874, the component (A) is produced by oxidative polymerizing 2,6-xylenol using Copper (I) amine complex as a catalyst, followed by copolymerization with further addition of 2,6-substituted bisphenols to obtain polyphenylene ether having 1.3 or more of phenolic hydroxyl groups on the molecular chain terminals per molecular chain. Further, based on the description in Japanese Patent Application Laid-Open No. 2003-261674 (corresponding to U.S. Patent Publication No. 20050070685), the component (A) can be produced by oxidative polymerizing 2,6-dimethylphenol, followed by reaction with phenols, peroxides, or diphenoquinon which is a side product of oxidative polymerization to obtain polyphenylene ether having 1.3 or more of phenolic hydroxyl on the molecular chain terminals per molecular chain.

The component (B) used in the present invention is represented by the following formula (2):

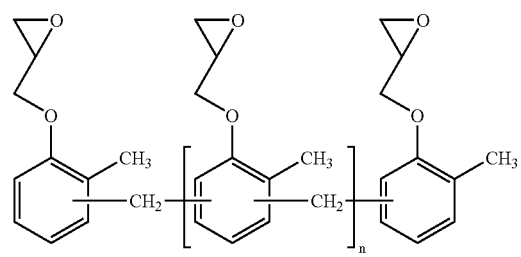

(2)

wherein n represents an integer of 0 or more.

For the component (B) of the present invention, commercially available cresol-novolac type epoxy resins can be used.

The softening point of the component (B) used in the present invention is preferably 150° C. or less, more preferably 130° C. or less, especially preferably 110° C. or less. The component (B) having a lower softening point liquefies at a lower temperature. Therefore, it can be more easily mixed with the component (A), and is easy to handle.

The component (C) is obtained by reacting the component (A) with the component (B). In this reaction, modification ratio of the component (A) is 5-95%. In view of solubility in MEK or acetone, its modification ratio is preferably 5% or more. While, in view of heat resistance of electronic materials, it si preferably 95% or less. The term "modification ratio" of the component (A) herein means the ratio of the number of epoxy-modified phenolic hydroxyl groups on the molecular chain terminals of the component (C) to the number of phenolic hydroxyl groups on the molecular chain terminals of the component (A). A modification ratio of the component (A) ($m_{od}$) can be calculated using an average number of phenolic hydroxyl groups on the molecular chain terminals of the component (A) (Np: number of phenolic hydroxyl groups per polyphenylene ether molecular chain) and an average number of phenolic hydroxyl groups on the molecular chain terminals of the component (C) (Nq: number of phenolic hydroxyl groups per polyphenylene ether molecular chain) according to the equation below:

$$m_{od}=[(Np-Nq)/Np]\times 100 (\%)$$

Np and Nq can be calculated in accordance with the method described in "KOBUNSHI RONBUNSHU" ("Japanese Journal of Polymer Science and Technology"), vol. 51, No. 7 (1994), p. 480. Specifically, a methylene chloride solution, in which the content of the component (A) or (C) is adjusted to be 0.2 g/L, is prepared and a 10 wt %-tetramethylammonium hydroxide solution is added thereto to measure absorbance difference at 318 nm between before and after the addition of the solution using a UV visible absorptiometer. Np and Nq are calculated from the absorbance difference and the number average molecular weight of the component (A).

The resin composition of the present invention contains the component (B') in an amount of 10-900 parts by weight based on 100 parts by weight of the total of the components (A') and (C). In view of solubility to MEK or acetone, the content of the component (B') is 10 parts by weight or more. While, in the view of improvement in the low permittivity and heat resistance of electronic materials achieved by incorporation of polyphenylene ether, the content of the component (B') is 900 parts by weight or less. The preferred is 25-100 parts by weight. the term "component (A')" herein means unreached residual portions of the component (A) used to obtain the component (C), or the component (A) additionally added after obtaining the component (C). The term "component (B')" herein means unreached residual portion of the component (B) used to obtain the component (C), or the component (B) additionally added after obtaining the component (C).

When the component (A) or (B) is not additionally added after obtaining the component (C) by reaction of the components (A) and (B), an amount (part by weight) of the component (B') can be calculated from the mass of a cresol-novolac type epoxy resin used for modification of the component (A), which is determined from the modification ratio of the component (A). For example, when $W_A$ (g) of the component (A) (number average molecular weight: $Mn_A$; number of phenolic hydroxyl group on the molecular chain terminals per molecular chain: Np) and $W_B$ (g) of the component (B) (number average molecular weight: $Mn_B$) are reacted at a modification ratio of $m_{od}$%, the amount of the component (B') is calculated as below: The mass $W_{By}$ (g) of an epoxy resin added to the polyphenylene ether is obtained:

$$W_{By}=[(W_A/Mn_A)\times Np\times m_{od}/100]\times Mn_B$$

Thus, the mass $W_{B'}$(g) of the component (B') is obtained:

$$W_{B'}=W_B-W_{By}$$

Using the above-obtained values, the amount (part by weight) of the component (B') based on 100 parts by weight of the total of the components (A') and (C) is expressed:

$$(W_B-W_{By})/(W_A+W_B)\times 100$$

Alternatively, the amount (part by weight) of the component (B') may be calculated by purifying the resin composition as follows. Specifically, in order to remove the component (B') remaining in the resultant resin composition, 2 g of the resin composition is first dissolved in 20 ml of toluene, and then a considerably excessive quantity of methanol is added thereto to precipitate the components (A') and (C). The precipitated components (A') and (C) are separated by filtration and then reduced-pressure dried for 1 hour under the conditions of 80° C. and 13.3 Pa. When the weight of the resin obtained after the purification process is expressed $W_{A'+C}$, the mass $W_{B'}$ (g) of the component (B') is expressed:

$$W_{B'}=2-W_{A'+C}$$

Using the above-obtained values, the amount (part by weight) of the component (B') based on 100 parts by weight of the total of the components (A') and (C) is expressed:

$$(2-W_{A'+C})/W_{A'+C}\times 100$$

It is preferable that the resin composition of the present invention do not contain cross-linked products. If the cross-linked products are not present, varnish prepared in the manufacturing process for electronic materials becomes homogeneous. As a result, low permittivity and heat resistance of the electronic materials are improved.

In the production process of the component (C) of the present invention, the feed amount of the component (B) is preferably 20 parts by weight or more, more preferably 40 parts by weight or more, especially more preferably 50 parts by weight or more, based on 100 parts by weight of the total of the components (A) and (B). From the viewpoint of improving solubility of the resin composition to a solvent by obtaining the component (C) having a high epoxy modification ratio, it is preferably 20 parts by weight or more. While, from the viewpoint of low permittivity and heat resistance of electronic materials, it is preferably 90 parts by weight or less.

In the production process of the present invention, it is preferable to use the component (A) in a solution or molten state. Although the component (A) in the solid state such as powder or pellet may be used, it takes prolonged time to increase the temperature because of the low rate of heat transfer, resulting in low production efficiency.

In the production process of the present invention, for the purpose of increasing the reaction rate, inhibiting side reactions, and controlling the structure of the component (C), a catalyst can be added to reaction system. Examples of the catalyst include alkali metal and compounds thereof, and basic nitrogen compounds. Specific examples of the catalyst include lithium, sodium, potassium, methylate sodium, sodium phenoxide, lithium hydroxide, sodium hydroxide, potassium hydroxide, potassium carbonate, sodium carbonate, ethylate sodium, tertiary amine such as a triethylamine and tributylamine, imidazole, and the like. Of these, methylate sodium, sodium hydroxide, triethylamine and tributylamine are preferable. Besides the above, quaternary ammonium salts also can be used as a catalyst.

In the production process of the present invention, other resins can be added to mixing system or reaction system. There is no particular limitation on resins used in the production process of the present invention, and the generally known thermoplastic resins and heat curable resins are preferably used. Examples of the thermoplastic resin include homopolymers of vinyl compounds such as ethylene, propylene, butadiene, isoprene, styrene, methacrylic acid, acrylic acid, methacrylate esters, acrylate esters, vinyl chloride, acrylonitrile, maleic anhydride, and vinyl acetate; copolymers of two or more of the vinyl compounds; polyamides; polyimides; polycarbonates; polyesters; polyacetals; polyphenylene sulfides; polyethylene glycol; polyethylene terephthalate; polybutylene terephthalate; polytrimethylene terephthalate; polypropylene terephthalate; and the like. Examples of the heat curable resin include phenol resins, epoxy compounds, and cyanate esters. The above thermoplastic resins and heat curable resins may be modified with a functional group.

In the production process of the present invention, the reaction temperature is preferably 80-250° C., more preferably 120-220° C., furthermore preferably 140-190° C. From the viewpoint of increasing the modification ratio by homogeneously mixing the components (A) and (B), the preferable reaction temperature is 80° C. or more. From the viewpoint of increasing the modification ratio by inhibiting side reactions, the preferable reaction temperature is 250° C. or less.

In the production process of the present invention, the reaction period is preferably within 3 hours, more preferably within 2 hours, especially preferably within 40 minutes. In view of solubility to the solvent such as MEK or acetone, the preferable reaction period is 1 minute or more. To restrain increase of the high molecular weight components caused by progress of cross linking reaction, the preferable reaction period is within 3 hours.

For the production process of the present invention, both batch process and continual process may be employed.

As the reactor vessel used to produce the component (C) of the present invention, any type of reactor vessel can be used as long as the components (A) and (B) can be homogeneously mixed, agitated or kneaded therein. If the melt viscosity of homogeneous composition in the molten state increases depending on composition of raw materials or a temperature or as the reaction proceeds, a kneader or an extruder available for high viscous compositions can be used.

The resin composition of the present invention can be used in combination with other resins. There is no particular limitation on the resins to be used, and the generally known thermoplastic resins and heat curable resins are preferably used. Examples of the thermoplastic resin include homopolymers of vinyl compounds such as ethylene, propylene, butadiene, isoprene, styrene, methacrylic acid, acrylic acid, methacrylate esters, acrylate esters, vinyl chloride, acrylonitrile, maleic anhydride, and vinyl acetate; copolymers of two or more of the vinyl compounds; polyamides; polyimides; polycarbonates; polyesters; polyacetals; polyphenylene sulfides; polyethylene glycol; polyethylene terephthalate; polybutylene terephthalate; polytrimethylene terephthalate; polypropylene terephthalate; and the like. Examples of the heat curable resin include phenol resins, epoxy resins, and cyanate esters. The above thermoplastic resins and heat curable resins may be modified with a functional group. The resin composition of the present invention may incorporate appropriate additives in accordance with purposes. Examples of the additive include flame retardant, thermo stabilizer, antioxidant, ultraviolet absorber, surfactant, lubricant, filler, polymer additive, dialkyl peroxide, peroxide carbonate, hydro peroxide, metal peroxide, and the like.

The resin composition of the present invention shows high solubility in solvents such as MEK and acetone. Further, it also shows high solubility in a mixture of those solvents or solvents containing toluene and the like.

A solution prepared by dissolving the resin composition of the present invention in MEK, acetone or the like can be suitably used as varnish used in the manufacturing process for electronic materials. To the varnish are added heat curable resins such as epoxy resins, phenol resins and cyanate esters, thermoplastic resins, epoxy resin curing agents, curing catalysts, flame retardant, and inorganic fillers such as silica, as needed. By reacting with an epoxy resin curing agent, a curing accelerator or a curing catalyst, the varnish forms a cured substance useful for electronic materials such as printed boards, insulation sealing materials, and insulator films.

The present invention will be described in more detail with reference to the following Examples and Comparative Examples.

EXAMPLES the components used in the Examples and Comparative Examples are as follows.

(A) Polyphenylene Ether

Polyphenylene ether (A), the component (A), produced by the method as described below was used.

<Production Method of Component (A)>

In accordance with the method disclosed in Japanese Patent Application Laid-Open NO. 2003-261674 (corresponding to U.S. Patent Publication No. 20050070685), the component (A) was produced. To a 1.5 jacketed reactor vessel equipped with a sparger for introducing oxygen containing gas, an agitating turbine blade and baffles at the bottom and a vent gas line with a reflux condenser at the top, 0.2512 g of cupric (II) chloride dihydrate, 1.1062 g of 35%-hydrochloric acid, 3.6179 g of di-n-butylamine, 9,5937 g of N,N,N',N'-tetramethylpropanediamine, 106 g of methanol, 600 g of n-butanol, and 180.0 g of 2,6-dimethylphenol containing 5 mol %-2,2-bis(3,5-dimethyl-4-hydroxyphenyl) propane were fed. Next, oxygen started to be introduced from the sparger into the reactor vessel at 180 ml/min. while stirring. During the polymerization, a heat transfer medium was passed through in the jacket so as to keep a polymerization temperature at 40° C. The polymerization liquid gradually changed into a slurry. When the polyphenylene ether achieved the intended number average molecular weight, the introduction of the gas containing oxygen was stopped to raise the temperature to 50° C. For the purpose of decoloring, hydroquinone was added in small portions. Until polyphenylene ether in the slurry state turned to be white, the temperature was kept at 50° C. After 720 g of 1N-hydrochloride methanol solution was added, the slurry was filtrated and washed with methanol repeatedly to obtain wet polyphenylene ether. Then, the wet polyphenylene ether was vacuum dried at 100° C. By controlling the drying time, the component (A) having a content of volatile components as listed below was obtained. The term "a content of volatile components" herein means a value calculated from a weight of the polyphenylene ether after 5-hour drying under the condition of 170° C. and 10 Pa (Wa) and a weight of the polyphenylene ether before drying (Wb) based on the following equation:

$$[(Wb-Wa)/Wb] \times 100 (\% \text{ by weight})$$

(A-1)
Drying time: 20 min.; Poly(2,6-dimethyl-1,4-phenylene) ether having the number average molecular weight of 2,600, Np of 1.66, and the volatile content of 1.0 wt. %, (A-2)
Drying time: 25 min.; Poly(2,6-dimethyl-1,4-phenylene) ether having the number average molecular weight of 1,500, Np of 1.44, and the volatile content of 0.6 wt. %, (A-3)
Drying time: 15 min.; Poly(2,6-dimethyl-1,4-phenylene) ether having the number average molecular weight of 2,900, Np of 1.82, and the volatile content of 1.6 wt. %, (A-4)
Drying time: 40 min.; Poly(2,6-dimethyl-1,4-phenylene) ether having the number average molecular weight of 2,600, Np of 1.66, and the volatile content of 0.01 wt. %, (A-5)
Drying time: 1 hr.; Poly(2,6-dimethyl-1,4-phenylene)ether having the number average molecular weight of 2,900, Np of 1.82, and the volatile content of 0.005 wt. %, (A-6)
Drying time: 30 min.; Poly(2,6-dimethyl-1,4-phenylene) ether having the number average molecular weight of 11,500, Np of 1.52, and the volatile content of 0.2 wt. %.

(B) Cresol-novolac Type Epoxy Resin (B-1)
EPICLON N-660 (trade name) manufactured by Dainippon Ink and Chemicals Inc.

<Evaluation Method>

1. Measurement of Molecular Weight of the Component (A)

The measurement was conducted using a gel permeation chromatography GPC System 21 (trade name) manufactured by Showa Denko K.K. under the following conditions:

Column: Shodex KF-G (trade name) and Shodex K-802.5 (trade name) manufactured by Showa Denko K.K., which were tandemly-arranged.

Detective wavelength: 283 nm

Detector: Shodex UV41 (trade name) manufactured by Showa Denko K.K. A measurement sample was prepared by dissolving 2 g of the component (A) in 20 cc of chloroform. The sample was supplied to GPC System 21 at an injection volume of 1 ml at a development flow of 1 ml/min. to measure elution time and quantity. A standard curve was obtained using 11 samples of polystyrene, TSK standard polystyrene (trade name) manufactured by Tosch Corporation, as a standard sample. The polystyrene samples had the known number average molecular weight and weight average molecular weight and different molecular weights. All the samples had molecular weight distribution of less than 1.2. The number average molecular weight and the weight average molecular weight of the measurement sample were calculated based on the standard curve.

2. Quantitative Determination of Phenolic Hydroxyl Groups on Molecular Chain Terminals Quantitative determination was conducted in accordance with the method described in "KOBUNSHI RONBUNSHU" ("Japanese Journal of Polymer Science and Technology"), vol. 51, No. 7 (1994), p. 480.

The determination was conducted using the following.

Spectrophotometer: U3310 (trade name); manufactured by Hitachi, Ltd.

Cell for absorbance measurement: light path length of 1 cm; made of quartz

The component (A) or the component (C) obtained by reaction of the components (A) and (B) was precisely weighed to be W mg. Methylene chloride dissolved the component (A) or (C) so that the total volume of the resultant solution is 25 ml. The absorbance of the methylene chloride solution at a wavelength of 318 nm was adjusted to zero. Then, 20 μl of a 10 wt %-tetramethylammonium hydroxide ethanol solution was added to the methylene chloride solution to measure change in absorbance every 10 seconds. The absorbance's measured between 30 and 60 seconds from the start of the measurement were plotted on a graph where time was read along the horizontal axis. The extrapolation value at time zero point of the approximate straight line of the plots was defined as X. The number ($\alpha$) of a hydroxyl group per 100 units of monomer in each polymer and number ($\beta$) of monomer units of each polymer were calculated based on the following equations, respectively:

$$\alpha = 12020/[(\epsilon \times W)/(25 \times X)]$$

$\epsilon$: extinction coefficient (=4,700 in "KOBUNSHI RONBUNSHU" ("Japanese Journal of Polymer Science and Technology"), vol. 51, No. 7 (1994))

$$\beta = (\text{number average molecular weight})/120.2$$

The number (N) of phenolic hydroxyl groups on the molecular chain terminals of each polymer was calculated from the following equation.

$$N = \beta/100 \times \alpha$$

3. Calculation of Modification Ratio

The modification ratio of the component (A) was calculated using a number of phenolic hydroxyl groups on the molecular chain terminals of the component (A) (Np) and a number of phenolic hydroxyl groups on the molecular chain terminals of the component (C), which is the reaction product obtained from the components (A) and (B), (Nq) according to the equation below.

$$(\text{Modification ratio}) = [(Np - Nq)/Np] \times 100 \ (\%)$$

4. Purification of Resin Composition for Measurement of Proton NMR and Modification Ratio To remove the component (B') remaining in the obtained resin composition, 2 g of the resin composition was dissolved in 20 ml of toluene, and then the components (A') and (C) were precipitated by adding a considerably excess quantity of methanol. The precipitated components (A') and (C) were separated by filtration and reduced-pressure dried for 1 hour under the condition of 80° C. and 13.3 Pa.

5. Amount (Part by Weight) of the Component (B')

when $W_A$ (g) of the component (A) (number average molecular weight: $Mn_A$, number of phenolic hydroxyl groups on the molecular chain terminals per molecule: Np) and $W_B$ (g) of the component (B) (number average molecular weight: $Mn_B$) were reacted, resulting in a modification ratio of $m_{od}$%, the mass $W_{By}$ (g) of the epoxy resin modifying polyphenylene ether was calculated based on the following equation:

$$W_{By} = [(W_A/Mn_A) \times Np \times m_{od}/100] \times Mn_B$$

Accordingly, the mass $W_{B'}$(g) of the component (B'), which is the epoxy resin that was not reacted, i.e., did not modify polyphenylene ether, was obtained from the following equation:

$$W_{B'}=W_B-W_{By}$$

Thus, the amount (part by weight) of the component (B') based on 100 parts by weight of the total of the components (A') and (C) was expressed by the following equation:

$$(W_B-W_{By})/(W_A+W_B)\times 100$$

6. Existence of Cross-Linked Products 10 g of the resin composition was mixed with 250 cc of chloroform at room temperature. In the instance where the solution became clouded it was determined that cross-linked products existed. In the instance where the solution did not become clouded it was determined that cross-linked products did not exist.

7. Solubility in Methyl Ethyl Ketene (MEK)

2.5 g of the resin composition and 7.5 g of MEK were mixed. The physical states after stirring for 4 hours at room temperature, and after standing for 24 hours at room temperature after the 4 hour stirring were visually observed. The instance where no insoluble was observed and the solution was clear was defined as good. The instance where no precipitation was observed but the solution was clouded was defined as fair. The instance where precipitation was observed was defined as poor.

8. Heat-Resistance of the Resin Composition 100 g of the resin composition and 3 parts by weight of 2-ethyl-4-methylimidazole based on 100 parts by weight of the feed amount of the component (B) were dissolved in 100 g of toluene at room temperature. E-glass (glass cloth 2116 (trade name); manufactured by Ashai-Schwebel Co., Ltd.) was impregnated with the resultant solution. The impregnated glass cloth was dried at room temperature for 10 minutes and further in a drier oven for 2 minutes at 150° C. to prepare a composite sheet of the resin and the glass cloth. The composite sheet was cut into a 10 square centimeters of piece. 6 pieces of the sheet were piled and sandwiched with copper foils having a thickness of 35 μm (GTS-MP foil (trade name); manufactured by Nikko Materials Co., Ltd.) so that the rough face of the copper foils contact the sheet, followed by 2 hour press molding using a press molding machine at a pressure of 7 MPa at 190° C. The resultant molded plate was cut into 2.5 square centimeters of plate. Further, all copper foils adhered tightly on the plate were peeled off besides a half of one side of the plate to prepare a specimen. The specimen was left for 1.5 hours in steam of 121° C., and then entirely immersed in molten tin of 262° C. for 20 seconds. After that, the specimen was taken out from the molten tin to observe the surface condition visually. The instance the surface condition was not changed at all before and after immersion in molten tin was defined as good. The instance where blisters or white spots appeared on the surface was defined as poor. The results of Examples are shown in Table 1. The results of Comparative Examples are shown in Tables 2 and 3.

Example 1

70 g o the component (B-1) was fed in a flask and heated at 190° C. in an oil bath. 30 g of the component (A-1) was added thereunto in small portions over 5 minutes while stirring. When the content of the flask was observed 3 minutes after the completion of the addition of the component (A-1), the component (A-1) was completely dissolved and the solution in the flask was clear brown. After continuous heating and stirring for 20 minutes from the starting of the addition of the component (A-I), the solution was transferred to an aluminum tray for cooling and solidification to obtain a resin composition containing a reaction product of the components (A) and (B). The resin composition was purified according to the method described in the above item 4 and subjected to proton NMR measurement. As a result, peaks derived from epoxy groups were observed in the range of 2.6-3.2 ppm., which confirms that the component (A) was epoxy-modified. Further, when the modification ratio of the component (A) was calculated in accordance with the above method, it was 47.0%.

Examples 2-9 and Comparative Examples 1-8

Resin compositions were obtained as in Example 1 except that the kinds of the component (A), amounts of the components (A) and (B), heating and stirring times from the starting of the addition of the component (A) were changed as shown in Tables 1 and 2, and subjected to the measurement.

Comparative Example 9

Solubility in MEK was observed in accordance with the method described above from 7 except that 0.75 g of the component (A-1) and 1.75 g of the component (B-1) were added in 7.5 g of MEK instead of 2.5 g of the resin composition.

Comparative Examples 10 and 11

Solubility in MEK was observed under the same condition as in Comparative Example 9 except that the kinds of the component (A) were changed as shown in Table 3.

TABLE 1

|  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| Polyphenylene ether (A): kind/weight (g) | (A-1)/30 | (A-1)/30 | (A-1)/30 | (A-2)/30 | (A-2)/30 | (A-3)/30 | (A-3)/30 | (A-1)/45 | (A-3)/45 |
| Heating and stirring time from the start of adding polyphenylene ether (A) | 20 | 12 | 30 | 20 | 12 | 20 | 12 | 20 | 20 |
| Cresol-novolac type epoxy resin (B-1): weight (g) | 70 | 70 | 70 | 70 | 70 | 70 | 70 | 55 | 55 |

TABLE 1-continued

|  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| Modification ratio (%) | 47.0 | 33.7 | 53.5 | 37.5 | 16.8 | 45.7 | 28.0 | 51.0 | 47.1 |
| Cresol-novolac type epoxy resin (B') (part by weight) based on 100 parts by weight of the total of polyphenylene ether (A') and epoxy-modified polyphenylene ether (C) | 162 | 179 | 155 | 152 | 191 | 204 | 188 | 76 | 72 |
| Existence of cross-linked product | Non-existence | Non-existence | Non-existence | Non-existence | Non-existence | Non-existence | Non-existence | Non-existence | Non-existence |
| Solubility (after 4 hr stirring) | Good | Good | Good | Good | Good | Good | Good | Good | Good |
| Solubility (after 24 hr standing) | Good | Good | Good | Good | Good | Good | Good | Good | Good |
| Heat resistance test | Good | Good | Good | Good | Good | Good | Good | Good | Good |

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
| --- | --- | --- | --- | --- | --- | --- | --- | --- |
| Polyphenylene ether (A): kind/weight (g) | (A-4)/30 | (A-5)/30 | (A-5)/30 | (A-1)/30 | (A-1)/30 | (A-6)/30 | (A-1)/90 | (A-1)/6 |
| Heating and stirring time from the start of adding polyphenylene ether (A) | 12 | 20 | 12 | 6 | 120 | 20 | 20 | 20 |
| Cresol-novolac type epoxy resin (B-1): weight (g) | 70 | 70 | 70 | 70 | 70 | 70 | 10 | 94 |
| Modification ratio (%) | 38.3 | 39.6 | 44.4 | 3.8 | 97.5 | 76.3 | 4.0 | 90.0 |
| Cresol-novolac type epoxy resin (B') (part by weight) based on 100 parts by weight of the total of polyphenylene ether (A') and epoxy-modified polyphenylene ether (C) | 173 | 172 | 166 | 226 | 113 | 206 | 8.6 | 1007 |
| Existence of cross-linked product | Non-existence | Non-existence | Non-existence | Non-existence | Existence | Existence | Non-existence | Non-existence |
| Solubility (after 4 hr stirring) | Fair | Good | Fair | Good | Swelled | Poor | Fair | Good |
| Solubility (after 24 hr standing) | Fair | Fair | Fair | Poor | Swelled | Poor | Poor | Good |
| Heat resistance test | Good | Good | Good | Poor | — | — | Poor | Poor |

In Comparative Examples 5 and 6, the resultant resin compositions exhibited poor solubility to toluene so that specimen to be subjected to the heat resistance test could not be obtained.

TABLE 3

|  | Comp. Ex. 9 | Comp. Ex. 10 | Comp. Ex. 11 |
| --- | --- | --- | --- |
| Polyphenylene ether (A): kind/weight (g) | (A-1)/0.75 | (A-2)/0.75 | (A-3)/0.75 |
| Cresol-novolac type epoxy resin (B-1): weight (g) | 1.75 | 1.75 | 1.75 |
| Existence of cross-linked product | Non-existence | Non-existence | Non-existence |
| Solubility (after 4 hr stirring) | Good | Good | Good |
| Solubility (after 24 hr standing) | Poor | Poor | Poor |
| Heat resistance test | Poor | Poor | Poor |

INDUSTRIAL APPLICABILITY

The resin composition of the present invention is advantageously applicable to electronic materials such as printed boards and insulation sealing material.

What is claimed is:

1. A resin composition comprising (C) an epoxy-modified polyphenylene ether obtained by reaction (A) a polyphenylene ether having a content of volatile components of 0.1-5.0% by weight and a number average molecular weight of 500 or more and less than $1.0 \times 10^4$ and (B) a cresol-novolac type epoxy resin at a modification ratio of component (A) of 5-95%, wherein (B') a cresol-novolac type epoxy resin is contained in an amount of 10-900 parts by weight based on 100 parts by weight of the total of the reaction product (C), and (A') a polyphenylene ether.

2. The resin composition according to claim 1, wherein component (B') is contained in an amount of 25-100 parts by weight based on 100 parts by weight of the total of components (C) and (A').

3. The resin composition according to claim 1, wherein cross-linked products are not present.

4. The resin composition according to claim 1, wherein the number average molecular weight of component (A) is 500-$4.0 \times 10^3$.

5. The resin composition according to claim 1, wherein the average number of phenolic hydroxyl on the molecular chain terminals of component (A) is 1.3 or more per molecule.

6. A production process of the resin composition containing component (C) according to any of claims 1-5, wherein components (A) and (B) are reacted at a reaction temperature of 80-250° C. for a reaction period of 1 minute to 3 hours.

* * * * *